(No Model.)

S. A. STIENBARGER.
PLOW ATTACHMENT.

No. 350,085.  Patented Sept. 28, 1886.

WITNESSES:
F. L. Ourand
D. H. Decker

INVENTOR:
Sheldon A. Stienbarger
by Louis Bagger & Co.
his Attorneys.

N. PETERS, Photo-Lithographer, Washington, D. C.

UNITED STATES PATENT OFFICE.

SHELDON A. STIENBARGER, OF AUGUSTA, ILLINOIS.

PLOW ATTACHMENT.

SPECIFICATION forming part of Letters Patent No. 350,085, dated September 28, 1886.

Application filed February 17, 1886. Serial No. 192,288. (No model.)

*To all whom it may concern:*

Be it known that I, SHELDON A. STIENBARGER, a citizen of the United States, residing at Augusta, in the county of Hancock and State of Illinois, have invented a new and useful Plow Attachment, of which the following is a specification.

My invention relates to improvements in plow attachments by which the ground is harrowed at the same time the plowing is done.

The object of my invention is to provide a mold-board extension and adjustable harrow for wheel and other plows. I attain this object by the mechanism illustrated in the accompanying drawings, in which—

Figure 1:
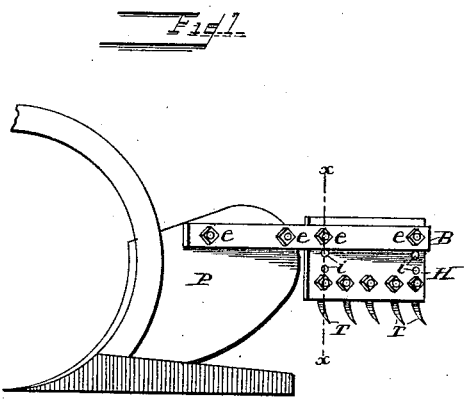
Figure 2:
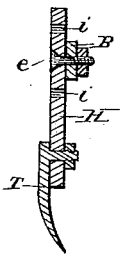

Figure 1 is a side elevation of the effective part of a plow with my invention attached thereto, and Fig. 2 is a vertical sectional view on the line $x\ x$.

Similar letters refer to similar parts.

The beam B is secured to the back side of the mold-board P by suitable bolts, $e\ e$, and extends across the furrow just turned in a substantially oblique direction, so as not to interfere with the moving earth. Secured to the front side of the beam B is a mold-board extension and harrow-head, H, which also extends across the fresh furrow, in substantially the same direction as the beam B, being secured thereto by the bolts $e\ e$, and being provided along its lower edge with the backwardly-inclined teeth T T. The upper ends of these teeth are provided with a rearwardly-projecting arm or lug, which passes through holes in the lower portion of the plate H and secures the teeth at any angle by means of nuts secured upon them, a small portion of each tooth being above the lug to cause the tooth to be drawn tightly against the plate. Said harrow-head H is provided with extra bolt-holes $i\ i\ i\ i$, so as to admit of its being vertically adjustable to suit the different depths of plowing.

I am aware that prior to my invention unlike attachments have been secured to the mold-boards of plows in similar manner to my own. I therefore do not broadly claim such a combination.

Having described my invention, what I claim as new, and wish to secure by Letters Patent, is—

The combination, with the mold-board of a plow, of a laterally-extending beam secured thereto, a plate having a vertical series of holes at each end, and a series of rearwardly-extending teeth secured to the lower edge of said plate, each tooth being provided with a rearwardly-extending lug or arm near its top, a small portion of each tooth extending above said lug or arm, and a nut upon the end of each of said arms.

SHELDON A. STIENBARGER.

Witnesses:
ANNA STIENBARGER,
BURK BURGESS.